United States Patent
Tominaga et al.

(10) Patent No.: US 8,998,420 B2
(45) Date of Patent: Apr. 7, 2015

(54) OPTICAL ELEMENT, LIGHT SOURCE DEVICE, AND PROJECTION-TYPE DISPLAY DEVICE

(75) Inventors: Shin Tominaga, Minato-ku (JP); Masao Imai, Minato-ku (JP); Goroh Saitoh, Minato-ku (JP); Masanao Natsumeda, Minato-ku (JP)

(73) Assignee: NEC Corporation, Tokyo (JP)

( * ) Notice: Subject to any disclaimer, the term of this patent is extended or adjusted under 35 U.S.C. 154(b) by 413 days.

(21) Appl. No.: 13/510,540

(22) PCT Filed: Oct. 27, 2010

(86) PCT No.: PCT/JP2010/069067
§ 371 (c)(1),
(2), (4) Date: May 17, 2012

(87) PCT Pub. No.: WO2011/062036
PCT Pub. Date: May 26, 2011

(65) Prior Publication Data
US 2012/0224149 A1    Sep. 6, 2012

(30) Foreign Application Priority Data
Nov. 18, 2009   (JP) ................................. 2009-262809

(51) Int. Cl.
*G03B 21/14*   (2006.01)
*G03B 21/28*   (2006.01)
(Continued)

(52) U.S. Cl.
CPC ............ *G02B 6/2848* (2013.01); *G02B 6/4204* (2013.01); *G02B 27/0944* (2013.01);
(Continued)

(58) Field of Classification Search
CPC ...... G02B 6/00; G02B 6/2848; G02B 6/4204; G02B 27/0944; G03B 21/2046; G03B 21/28; G03H 2223/23; G03H 2223/16; G03H 2223/24; G03H 2225/52; G03H 2240/15
USPC ........ 353/20, 98; 359/15, 22, 24, 486.02, 300
See application file for complete search history.

(56) References Cited

U.S. PATENT DOCUMENTS

2009/0197187 A1*   8/2009   Yamauchi et al. ................ 430/2

FOREIGN PATENT DOCUMENTS

| CN | 1680854 A | 10/2005 |
|---|---|---|
| CN | 101510070 A | 8/2009 |

(Continued)

OTHER PUBLICATIONS

Office Action dated Jan. 14, 2014, issued by the State Intellectual Property Office of the P.R.C. in corresponding Chinese Application No. 201080052303.8.

(Continued)

*Primary Examiner* — Toan Ton
*Assistant Examiner* — Magda Cruz
(74) *Attorney, Agent, or Firm* — Sughrue Mion, PLLC

(57) ABSTRACT

A hologram layer (13) is irradiated by light from an optical element (10). The hologram layer (13) is provided with a first hologram (14) that diffracts in a predetermined direction, from among incident light from the optical element (10), X-polarized light in which the polarization component is in a specific direction and emits the light as X-polarized light of a first phase state (P1), and a second hologram (15) that both diffracts in the same direction as the X-polarized light of the first phase state (P1) and moreover at an equal radiation angle, from among incident light from the optical element (10), Y-polarized light in which the polarization component is in a direction orthogonal to that of the X-polarized light and converts it to X-polarized light, and emits the light as X-polarized light of a second phase state (P2) that differs from the first phase state (P1).

18 Claims, 15 Drawing Sheets

(51) Int. Cl.
- *G02B 5/32* (2006.01)
- *G02B 5/30* (2006.01)
- *G02B 27/28* (2006.01)
- *G02B 26/08* (2006.01)
- *G03H 1/28* (2006.01)
- *G02F 1/29* (2006.01)
- *G02B 6/28* (2006.01)
- *G02B 6/42* (2006.01)
- *G02B 27/09* (2006.01)
- *G03B 21/20* (2006.01)
- *F21V 8/00* (2006.01)
- *G03H 1/02* (2006.01)
- *G03H 1/22* (2006.01)

(52) U.S. Cl.
CPC ............ *G03B21/2046* (2013.01); *G03B 21/28* (2013.01); *G02B 5/3033* (2013.01); *G02B 5/32* (2013.01); *G02B 6/005* (2013.01); *G03H 1/28* (2013.01); *G02B 6/0056* (2013.01); *G03H 1/0248* (2013.01); *G03H 2001/2276* (2013.01); *G03H 2222/31* (2013.01)

(56) References Cited

FOREIGN PATENT DOCUMENTS

| | | |
|---|---|---|
| JP | 09-178949 A | 7/1997 |
| JP | 11-184387 A | 7/1999 |
| JP | 11-271536 A | 10/1999 |
| JP | 200222963 A | 1/2002 |
| JP | 200290538 A | 3/2002 |
| JP | 2003-167127 A | 6/2003 |
| JP | 2003-207646 A | 7/2003 |
| JP | 2004287347 A | 10/2004 |
| JP | 2005-243412 A | 9/2005 |

OTHER PUBLICATIONS

Communication dated Sep. 2, 2014 from the Japanese Patent Office in counterpart Japanese Patent Application No. 2011541864.

* cited by examiner

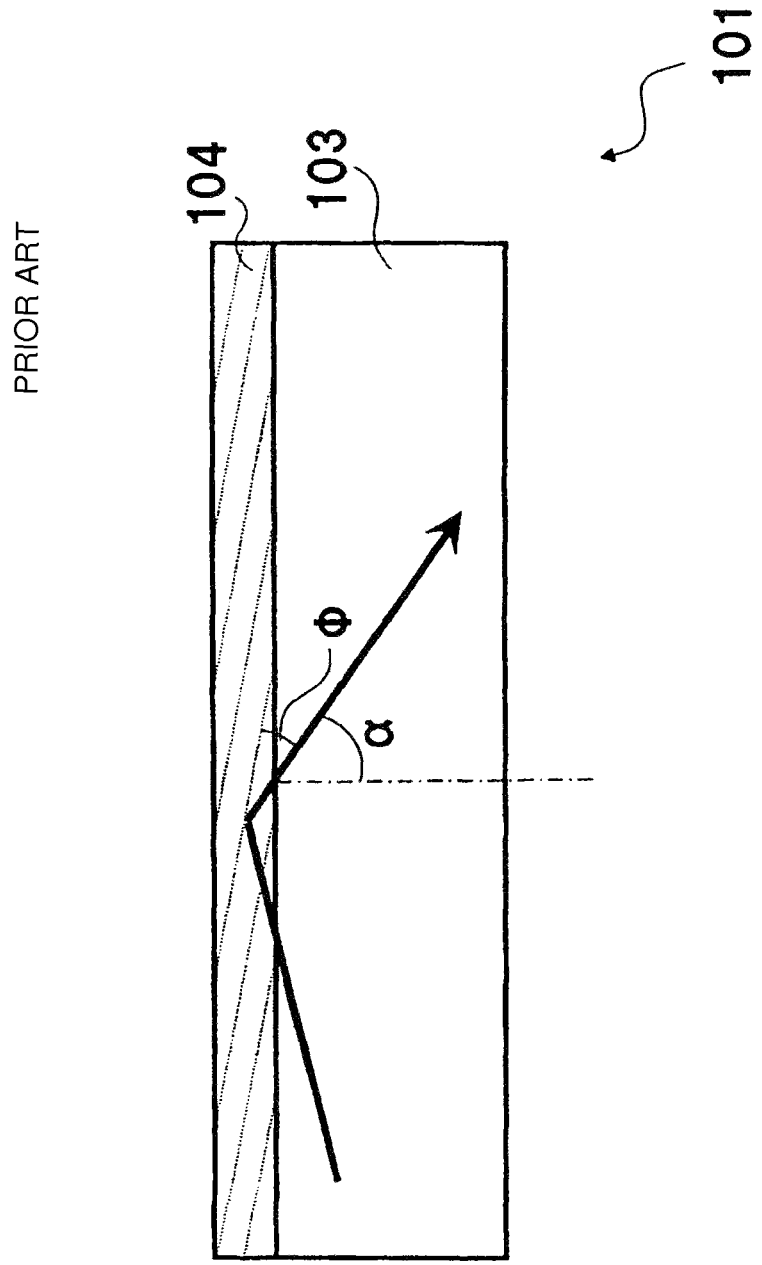

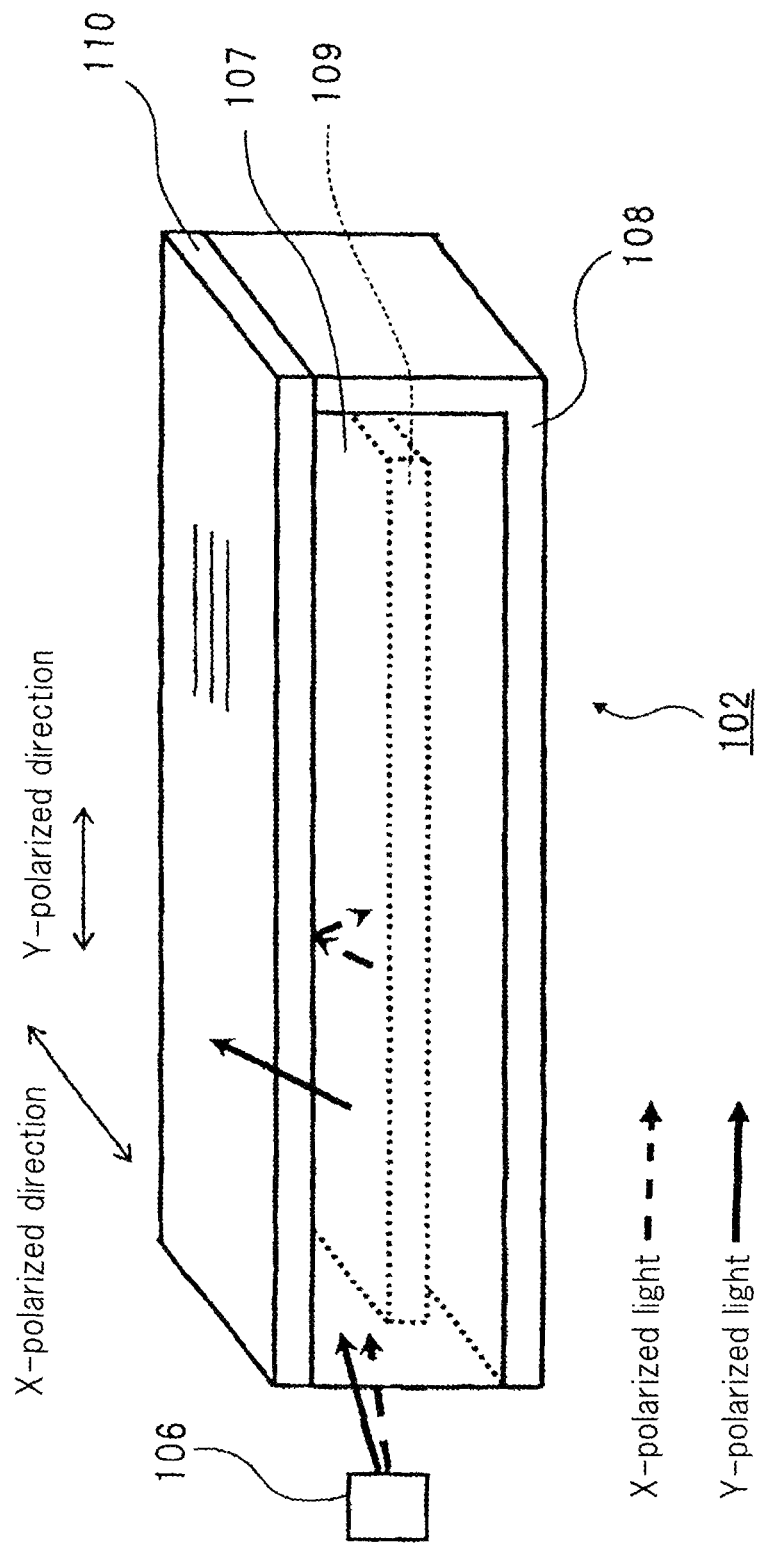

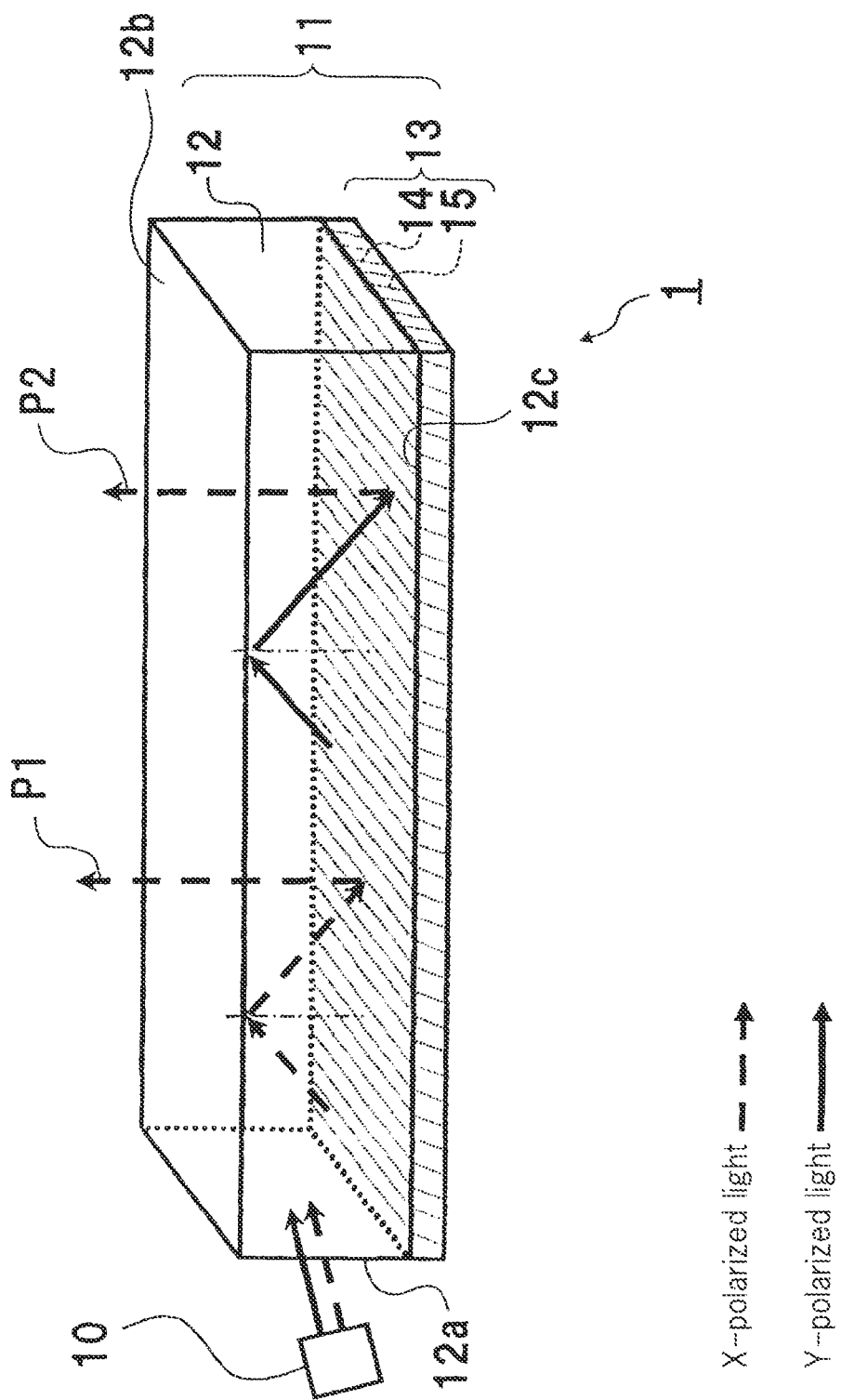

Fig.5B

| 0 | 0 |
|---|---|
| $\pi$ | $\pi$ |

Fig.5C

| 0 | $\pi$ |
|---|---|
| 0 | $\pi$ |

Fig.5D

| 0 | $\pi$ |
|---|---|
| $\pi$ | 0 |

US 8,998,420 B2

OPTICAL ELEMENT, LIGHT SOURCE DEVICE, AND PROJECTION-TYPE DISPLAY DEVICE

CROSS REFERNCE TO RELATED APPLICATION

This application is a Nation Stage of International Application No. PCT/JP2010/069067, filed on Oct. 27, 2010, which claims priority from Japanese Patent Application No. 2009-262809, filed on Nov. 18, 2009, the contents of all of which are incorporated herein by reference in their entirety.

TECHNICAL FIELD

The present invention relates to an optical element that uses a hologram for emitting light, and to a light source device and projection-type display device.

BACKGROUND ART

A LED projector has been proposed that has a light source device that employs a light-emitting diode (LED) as a light source. Compared to a discharge lamp, an LED, which is a solid-state light source, has the advantages of being mercury-free, capable of quick-start/quick-off lighting operation, and is highly durable. An LED projector of this type of the prior art is made up of a light source device, illumination optics into which light from the light source device is irradiated, a light valve having a liquid crystal display panel into which light from the illumination optics is irradiated, and projection optics for projecting light from the light valve onto a projection surface.

In order to increase the luminance of a projected image in this type of LED projector, it is desirable that all possible measures be taken to limit optical loss in the optical path from the light source device to the projection surface.

The two chief causes of optical loss that can be considered are as described below.

The first cause is polarization loss that arises from the polarization dependence of a liquid crystal display panel or dichroic prism.

The second cause is the occurrence of light that diverges and does not enter each optical element arranged on the optical path, i.e., optical loss resulting from eclipse in each optical element. This occurs because light from a light source device cannot be used as projection light unless the product of the angle of radiation (solid angle) of emitted light from optical elements belonging to the light source device and the light emission area (etendue) is made equal to or lower than the value of the product of the area of the display element and the acceptance angle (solid angle) that is determined by the f-number of the projection lens.

As one countermeasure for solving the above-described problems relating to optical loss, the use of an optical element that has a hologram has been proposed with the object of generating light that is irradiated into a liquid crystal display element.

As one example of an optical element that uses a hologram, Patent Document 1 discloses optical element 101 that is provided with: light guide body 103 into which light from a fluorescent tube as a light source is irradiated; and hologram layer 104 that diffracts light from this light guide body 103, as shown in FIG. 1. In this optical element 101, light that is irradiated into hologram layer 104 at an angle φ formed by the light from light guide body 103 and the interference fringe of hologram layer 104 is diffracted in light guide body 103 at an angle of emission α from hologram layer 104.

As another example of an optical element that employs a hologram, Patent Document 2 discloses optical element 102 that is provided with light guide body 107 into which is irradiated light from LED 106 as the light source, diffusion hologram layer 108 that diffracts light from this light guide body 107, polarization-conversion layer 109 that confers a predetermined phase difference to mutually orthogonal polarization components belonging to the transmitted light, and polarization-separation layer 110 that emits only light of linearly polarized light that has a polarization component of a specific direction from this polarization conversion layer 109, as shown in FIG. 2.

LITERATURE OF THE PRIOR ART

Patent Documents

Patent Document 1: Japanese Unexamined Patent Application Publication No. H11-184387
Patent Document 2: Japanese Unexamined Patent Application Publication No. 2003-207646

SUMMARY OF THE INVENTION

Problem to be Solved by the Invention

Nevertheless, in the configuration described in the above-mentioned Patent Document 1, light that is diffracted by hologram layer 104 is merely being emitted. As a result, although emitted light having high directivity is obtained with a small number of parts in this configuration, linearly polarized light having a polarization component of a specific direction cannot be obtained.

On the other hand, although linearly polarized light having a polarization component of a specific direction is obtained in the configuration described in Patent Document 2, the configuration has a large number of parts, including a light guide body, a diffusion-hologram layer, a polarization-conversion layer, and a polarization-separation layer. As a result, this configuration entails the problems of complicated fabrication, high manufacturing costs, and high optical loss.

It is an object of the present invention to provide an optical element that solves the problems of the above-described related art, i.e., that can emit with high efficiency light that is linearly polarized light having a polarization component of a specific direction, and moreover, that has high directivity and that enables a reduction of the number of parts, and further, to provide a light source device and projection-type display device that is equipped with this optical element.

Means for Solving the Problem

To achieve the above-described objects, the optical element according to the present invention is equipped with a hologram layer into which light from a light source is irradiated. The hologram layer includes a first hologram that diffracts in a predetermined direction, from among light irradiated from the light source, first linearly polarized light in which the polarization component is in a specific direction and emits the result as first linearly polarized light of a first phase state; and a second hologram that both diffracts in the same direction as the first linearly polarized light, and moreover, at an equal radiation angle, from among light irradiated from the light source, second linearly polarized light in which the polarization component is in a direction orthogonal to that of the first linearly polarized light and converts it to the first linearly polarized light, and that emits the result as first linearly polarized light of a second phase state that differs from the first phase state.

In addition, the light source device according to the present invention is equipped with the optical element of the present invention, a light guide body into which light from a light source is irradiated, and at least one light source arranged on the periphery of the light guide body.

In addition, the projection-type display device according to the present invention is equipped with: the light source device of the present invention, display elements that confer picture information to the emitted light of the light source device, and projection optics that project a projection image realized by the emitted light of the display elements.

Effect of the Invention

According to the present invention, the number of parts that make up an optical element can be reduced, and further, the light that is irradiated from a light source to an optical element can be converted to linearly polarized light of a specific direction, and moreover, emitted light of high directivity can be generated with high efficiency.

BRIEF DESCRIPTION OF THE DRAWINGS

FIG. 1 is a sectional view for describing the configuration of Patent Document 1.

FIG. 2 is a perspective view for describing the configuration of Patent Document 2.

FIG. 3 is a perspective view giving a schematic representation of the light source device of the first exemplary embodiment.

Figures 5B, 5C, 5D:
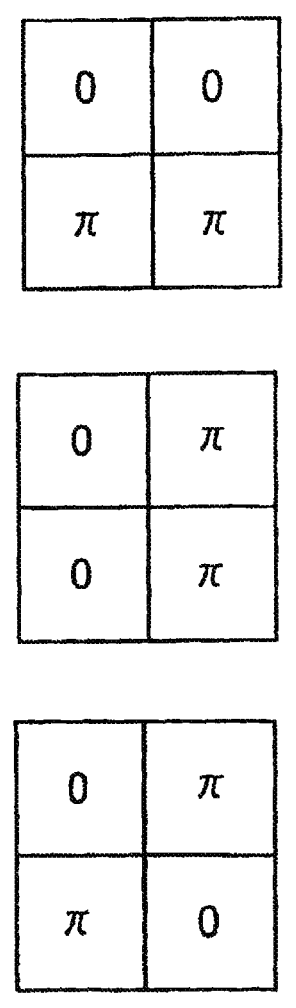

FIG. 5B shows an example of the pattern of signal light that is used when recording each of the first hologram and second hologram of the hologram layer in the first exemplary embodiment.

FIG. 5C shows an example of the pattern of signal light that is used when recording each of the first hologram and second hologram of the hologram layer in the first exemplary embodiment.

FIG. 5D shows an example of the pattern of signal light that is used when recording each of the first hologram and second hologram of the hologram layer in the first exemplary embodiment.

BEST MODE FOR CARRYING OUT THE INVENTION

Figure 4A:
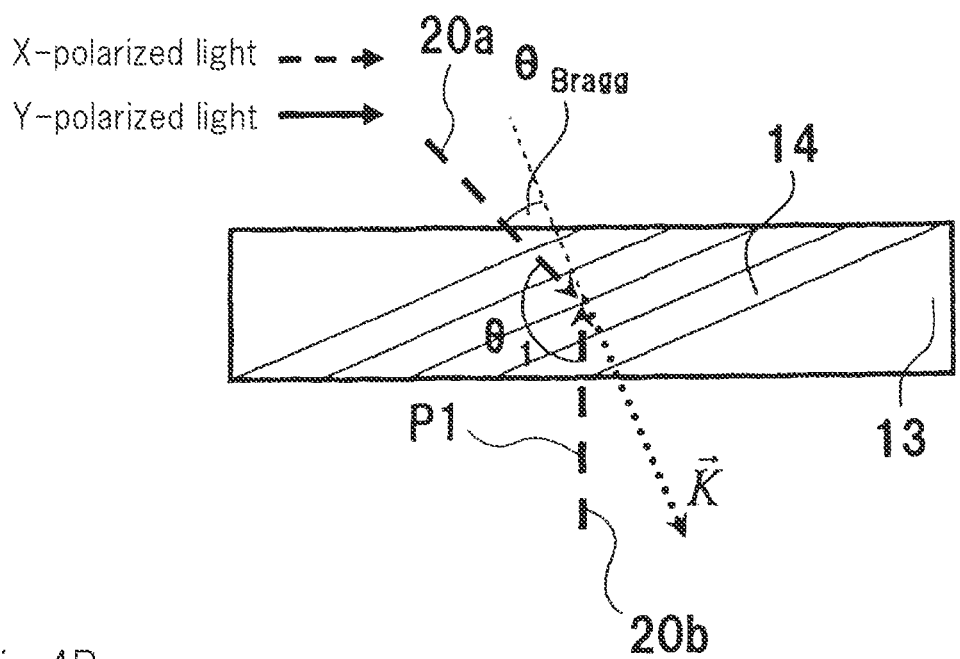
FIG. 4A is a schematic view for describing the hologram formation process and the diffraction action of the hologram layer in the first exemplary embodiment.

Actual exemplary embodiments of the present invention are next described with reference to the accompanying drawings.

First Exemplary Embodiment

FIG. 3 shows a perspective view of the light source device of the first exemplary embodiment. Because the actual thickness of each separate layer is extremely small and the differences in thickness of each of the layers are great in the light source device, it is difficult to accurately depict the scale and proportions of each layer. As a result, each layer is shown schematically in the drawings without depicting each layer according to its actual proportions.

As shown in FIG. 3, light source device 1 of the first exemplary embodiment is provided with light-emitting element 10 as a light source, and optical element 11 into which is irradiated the light that is emitted from this light-emitting element 10.

Optical element 11 is provided with light guide body 12 into which is irradiated light that is emitted from light-emitting element 10, and hologram layer 13 that is provided in this light guide body 12 and that subjects light that is irradiated from light guide body 12 to diffraction and polarization conversion.

A component such as light-emitting diode (LED) that is a solid-state light source, a laser diode, a super-luminescent diode, or an ultra-high pressure mercury lamp is used as light-emitting element 10 that is provided in light source device 1. In the present exemplary embodiment, light-emitting element 10 is arranged at a position that faces the side surface of plate-shaped light guide body 12. Light-emitting element 10 may be arranged separated from light-incidence surface 12a, or a configuration may be adopted in which light-emitting element 10 is optically connected to light guide body 12 by means of a light guide component such as a light pipe.

Light guide body 12 is formed in a plate shape, and light-incidence surface 12a is formed as a light-incidence portion on the side surface into which light from light-emitting element 10 is irradiated. In addition, light guide body 12 includes first surface 12b on the side from which the emitted light is emitted from optical element 11, and includes second surface 12c on the side opposite this first surface 12b.

Although light guide body 12 is formed in a plate shape in the present exemplary embodiment, the shape of light guide body 12 is not limited to a rectangular parallelepiped. The medium surrounding light source device 1 may be any of a solid, liquid, or gas, and the media on the light-incidence side of optical element 11 which light from light-emitting element 10 enters and the media on the light-emission side which light from optical element 11 exits, may be different.

For the sake of convenience in the explanation in the following description, the direction that is parallel to the axis of polarization of light that is diffracted by first hologram 14 (to be described) of hologram layer 13 is the "X direction"; the axis of polarization of light that undergoes polarization-conversion in second hologram 15 (to be described) of hologram layer 3 and that is orthogonal to this X direction is the "Y direction"; and the X-polarization component of light from light-emitting element 10 and linearly polarized light that has undergone polarization conversion and in which the polarization direction is the X-direction are referred to as "X-polarized light" and is indicated in the figures by broken-line arrows. Similarly, the Y-polarization component of light from light-emitting element 10 is referred to as "Y-polarized light" and is indicated in the figures by solid-line arrows.

As shown in FIG. 3, hologram layer 13 is provided on second surface 12c of light guide body 12. Hologram layer 13 includes first hologram 14 that diffracts, from among light irradiated from light guide body 12, X-polarized light as first linearly polarized light in which the polarization component is in a specific direction and emits the light as X-polarized light of first phase state P1; and second hologram 15 that both diffracts, from among light irradiated from light guide body 12, Y-polarized light as second linearly polarized light in substantially the same direction as the X-polarized light and moreover at an equal angle of radiation and converts the light to X-polarized light and further emits the result as X-polarized light of second phase state P2 that differs from the first phase state P1. In other words, first hologram 14 and second hologram 15 are formed such that the phase states of X-polarized light that is emitted from each of first hologram 14 and second hologram 15 are different.

Essentially, hologram layer 13 of optical element 11 has the function of diffracting only incident light that satisfies the Bragg diffraction condition by the interference fringe formed by first hologram 14. In addition, hologram layer 13 has the function of diffracting only incident light that satisfies the Bragg diffraction condition to both diffraction and the function of performing polarization conversion by the interference fringe formed by second holograms 15. First hologram 14 and second hologram 15 then each emit X-polarized light from first surface 12b of light guide body 12 at the emission angle of 0 degrees. Here, the angle of emission is assumed to be the angle from the normal line of first surface 12b.

Figure 4B:
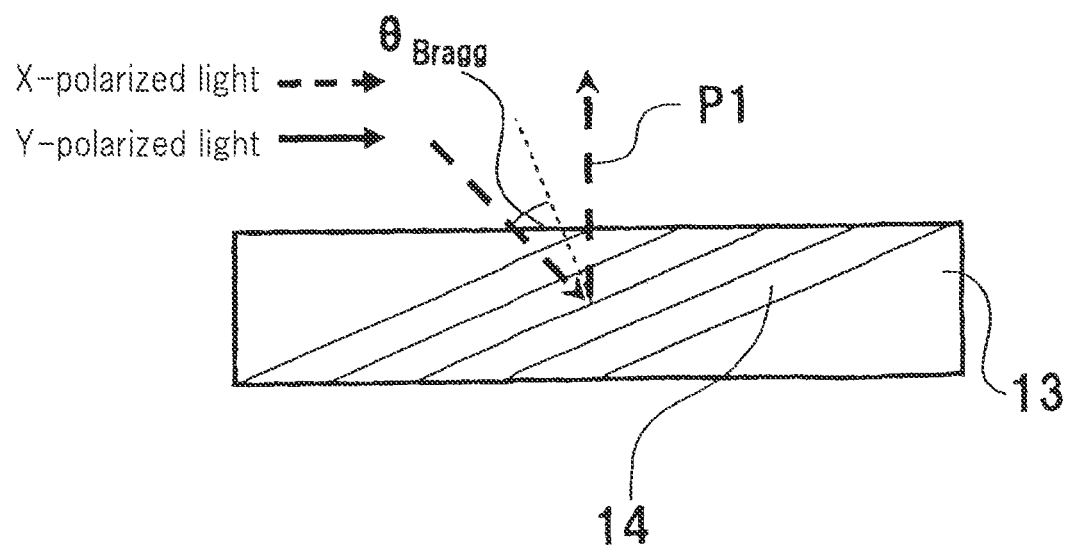
FIG. 4B is a schematic view for describing the hologram formation process and diffraction action of the hologram layer in the first exemplary embodiment.
Figure 4C:
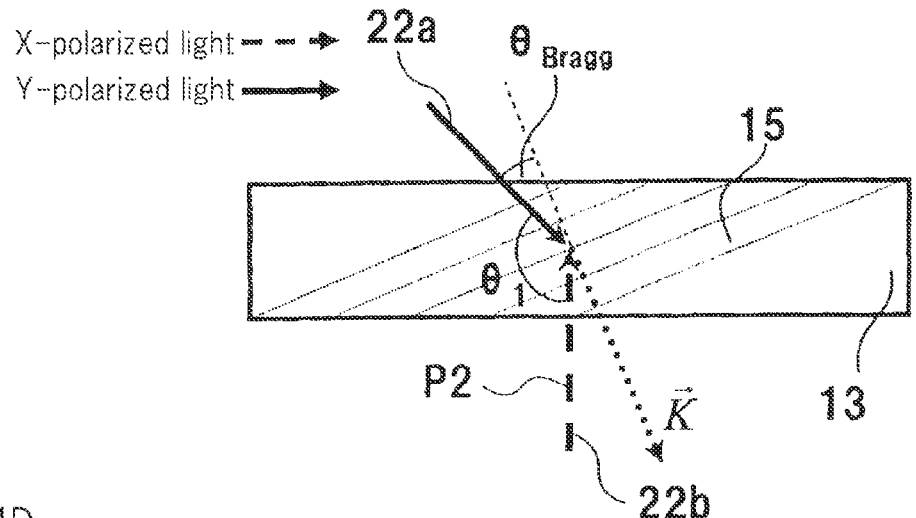
FIG. 4C is a schematic view for describing the hologram formation process and diffraction action of the hologram layer in the first exemplary embodiment.
Figure 4D:
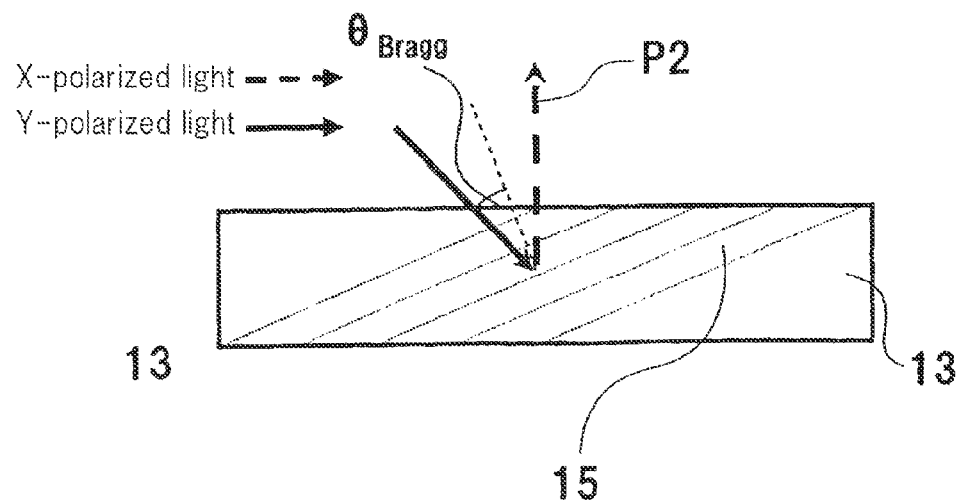
FIG. 4D is a schematic view for describing the hologram formation process and diffraction action of the hologram layer in the first exemplary embodiment.
Figure 5A:
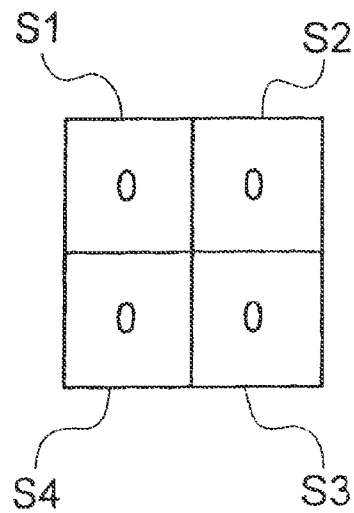
FIG. 5A shows an example of the pattern of signal light that is used when recording each of the first hologram and second hologram of the hologram layer in the first exemplary embodiment.

FIG. 4A gives a schematic representation for describing the process of forming first hologram 14. FIG. 4B gives a schematic representation for describing the diffraction action when the angle of incidence of light irradiated into first hologram 14 satisfies the Bragg diffraction condition. FIG. 4C is a schematic representation for describing the process of forming second holograms 15. FIG. 4D shows a schematic representation for describing the diffraction action when the angle of incidence of incident light to second hologram 15 satisfies the Bragg diffraction condition. The angle of incidence of light to first and second holograms 14 and 15 and the angle of emission (diffraction angle) of light from first and second holograms 14 and 15 assume that the direction orthogonal to the interface with light guide body 12 of hologram layer 13 is 0 degrees.

As shown in FIG. 4A, using a hologram material such as an azobenzene photopolymer, reference light 20a and signal light 20b are each irradiated into a hologram material formed to a thickness on the order of 1 mm so as to form a predetermined interference angle θ1. Azobenzene has birefringence having indices of refraction that differ for each polarization component having a direction that is orthogonal to the molecular optical axis and for each polarization component having a direction parallel to the optical axis, and moreover, is a material in which the direction of orientation of the molecular major axis is orthogonal to the direction of polarization of irradiated light. As a result, azobenzene is capable of recording the phase distribution of irradiated light as the refractive index profile of the material and is capable of recording the polarization distribution of irradiated light as the molecular orientation distribution.

Accordingly, when forming first hologram 14, X-polarized light of first phase state P1 is irradiated into the hologram material as signal light 20b at an angle of incidence of 0 degrees with respect to the interface of hologram layer 13 and X-polarized light is irradiated as reference light 20a at a predetermined interference angle of θ1 with respect to signal light 20b. As a result, the phase distribution for the X-polarized light is produced in the vicinity of the intersection of the signal light and reference light and the magnitude of the amplitude of the X-polarized light that accords with the phase distribution forms desired first hologram 14 as the refractive index profile of azobenzene.

Due to this formation of first hologram 14, when the angle of incidence of light that is irradiated into first hologram 14 of hologram layer 13 satisfies the Bragg diffraction condition as shown in FIG. 4B, signal light 20b shown in FIG. 4A is reproduced from first hologram 14, whereby X-polarized light of first phase state P1 is diffracted at an angle of diffraction of 0 degrees with respect to the interface of hologram layer 13 with light guide body 12. The X-polarized light from hologram layer 13 passes through light guide body 12 and is emitted from optical element 11 as X-polarized light of first phase state P1 at an angle of emission of 0 degrees.

X-polarized light that is irradiated at an angle with respect to the interface of hologram layer 13 with light guide body 12 that does not satisfy the Bragg diffraction condition passes through first hologram layer 13 without being diffracted by first hologram 14 and is reflected at the interface between hologram layer 13 and the outside of hologram layer 13 to be returned to light guide body 12.

Next, when forming second hologram 15, X-polarized light of second phase state P2 is irradiated as signal light 22b into the hologram material at an angle of incidence of 0 degrees with respect to the interface of hologram layer 13 and Y-polarized light is irradiated as reference light 22a at a predetermined interference angle θ1 with respect to signal light 22b. In this way, a polarization distribution is produced in the vicinity of the intersection of signal light 22b and reference light 22a and desired second hologram 15 is formed as the orientation distribution of azobenzene.

Due to this formation of second hologram 15, when the angle of incidence of light that is irradiated into second hologram 15 of hologram layer 13 satisfies the Bragg diffraction condition as shown in FIG. 4D, X-polarized light of second phase state P2 is diffracted at a diffraction angle of 0 degrees with respect to the interface of hologram layer 13 with light guide body 12 based on reproduction of signal light 22*b* shown in FIG. 4C from second hologram 15. The X-polarized light from hologram layer 13 passes through light guide body 12 and is emitted at an angle of emission of 0 degrees from optical element 11 as X-polarized light of second phase state P2.

Y-polarized light that is irradiated at an angle to the interface of hologram layer 13 with light guide body 12 that does not satisfy the Bragg diffraction condition is transmitted through hologram layer 13 without being diffracted by second hologram 15, and moreover, without being converted to X-polarized light, and is reflected at the interface between hologram layer 13 and the outside of hologram layer 13 to be returned to light guide body 12.

In other words, first hologram 14 in the present exemplary embodiment is a phase hologram in which the phase distribution of light in the hologram material is recorded as the refractive index profile for a specific polarization component. In addition, second hologram 15 is a polarization hologram in which the polarization distribution in the hologram material is recorded as the molecular orientation distribution.

FIGS. 5A-5D each show examples of the patterns of signal light of first phase state P1 and second phase state P2. These are patterns in a plane that is orthogonal to the optical axis of the signal light. Here, first area S1, second area S2, third area S3, and fourth area S4 that divide the area into four with the optical axis as center are arranged clockwise as viewed from the direction of progression of the signal light.

Each phase state in first to fourth areas S1-S4 is a combination of "0," which is a specific phase state, and "π," which is a phase state in which phase is shifted by 180 degrees from phase state "0." Due to the use of patterns of this type, the patterns of signal light differ from each other, and phase distributions (phase codes) having low mutual correlation are obtained. A typical Walsh-Hadamard transform can be used in the generation of these phase codes.

When forming first and second holograms 14 and 15, using any two of each of the patterns shown in FIGS. 5A-5D, as the patterns of each signal light, first hologram 14 and second hologram 15, that each diffract light of mutually different phase states, are formed. The patterns of the signal light and the number (number of divisions) of areas belonging to the patterns of the signal light are open to variation as long as the correlation of first phase state P1 and second phase state P2 is low and of course are not limited to the case of four divisions that follows a Walsh-Hadamard transform that is here offered as an example.

In the present exemplary embodiment as described hereinabove, the difference of first phase state P1 of X-polarized light that is diffracted by first hologram 14 and second phase state P2 of light that undergoes diffraction and polarization-conversion at second hologram 15 and, moreover, their low mutual correlation prevents the diffraction at second hologram 15 of X-polarized light that is diffracted by first hologram 14 when irradiated from first hologram 14 to second hologram 15, whereby the X-polarized light passes through second hologram 15, and similarly, prevents the diffraction at first hologram 14 of X-polarized light that is diffracted at second hologram 15 when irradiated from second hologram 15 to first hologram 14, whereby the X-polarized light passes through first hologram 14. The setting of the correlation between first phase state P1 and second phase state P2 to a low level is similar when first and second holograms 14 and 15 in hologram layer 13 are formed in multiple layers, and is necessary regardless of the relative positions of first hologram 14 and second hologram 15 in the direction of thickness of hologram layer 13.

In addition, in the case of light having a specific angle range that is not light for which the angle of incidence to hologram layer 13 is a specific angle, a plurality of first holograms 14 and a plurality of second holograms 15 that correspond to each of predetermined angles of incidence are formed in hologram layer 13.

For the sake of convenience in explanation, first holograms 14 of hologram layer 13 will be described hereinbelow, and second holograms 15, being similar, will be described briefly.

Figure 6:
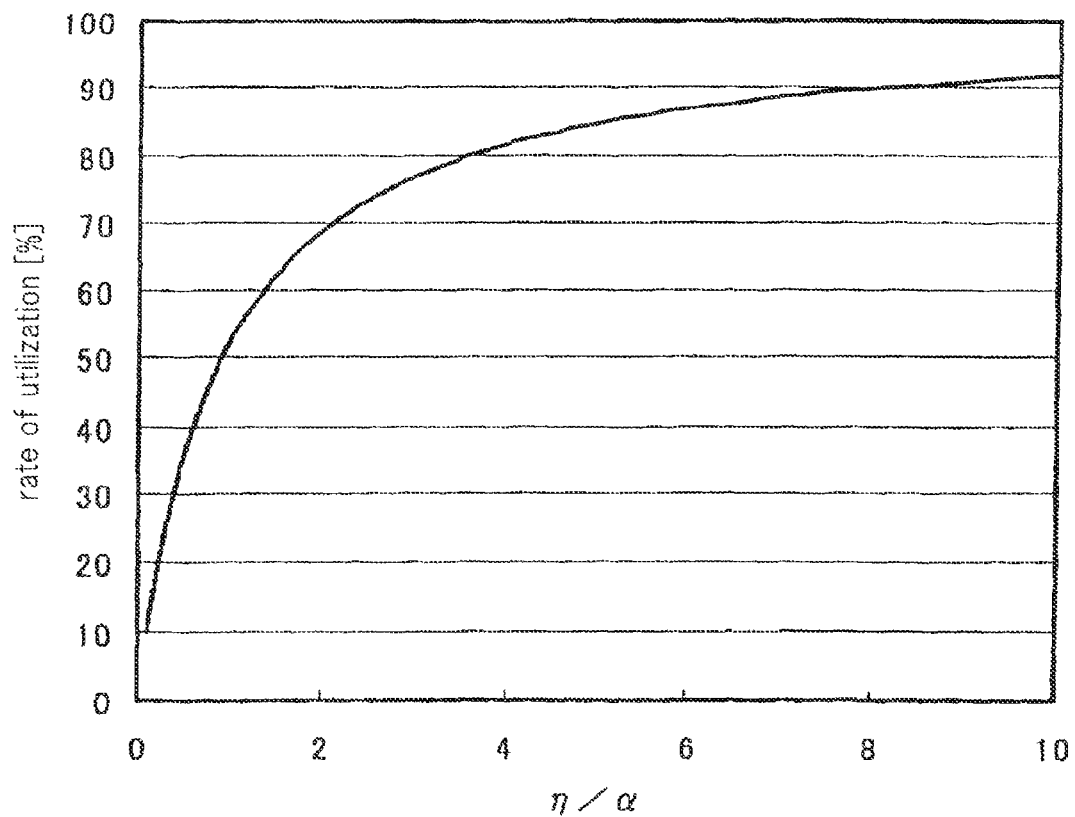
FIG. 6 shows the relation between the value of "diffraction efficiency/optical loss" and the rate of utilization of light in the hologram layer.

FIG. 6 shows the relation between the value "diffraction efficiency η/optical loss α" that is the ratio of the diffraction efficiency η at the time of diffraction at first hologram 14 relating to light that undergoes multiple reflection in light guide body 12 in the configuration shown in FIG. 3 and optical loss α from a particular diffraction until the next diffraction and the light utilization rate that is the ratio of light that is irradiated into optical element 11 and all light that is diffracted from hologram layer 13. As shown in FIG. 6, when the value of "diffraction efficiency η/optical loss α" is set to the order of "8," the utilization rate of hologram layer 13 is in the order of 90%. Accordingly, if loss α is, for example, 0.125%, diffraction efficiency η should be set to 1% so that the utilization rate of optical element 11 can reach the order of 90%.

Figure 7:
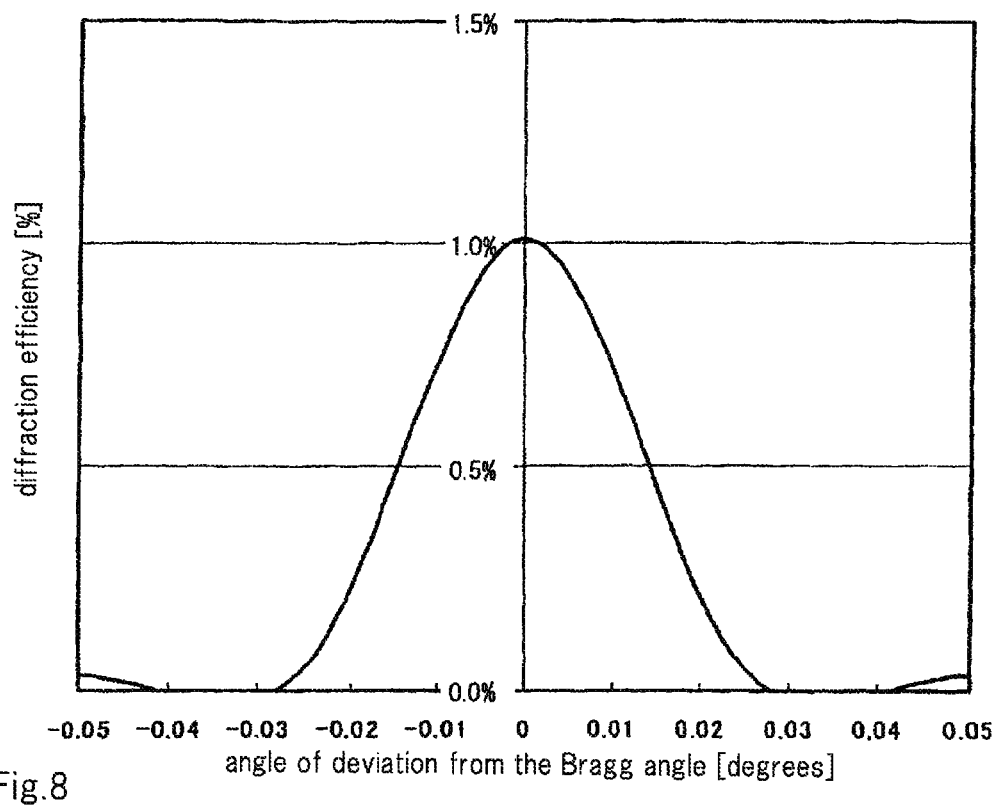
FIG. 7 shows the relation between the angle of divergence from the Bragg angle and the diffraction efficiency in the hologram layer.

FIG. 7 shows the relation between the angle of deviation from the Bragg angle θBragg and the diffraction efficiency in hologram layer 13. Regarding the calculation conditions, using light of a wavelength of 460 nm, the interference angle θ1 between the above-described reference light 20*a* and signal light 20*b* is 135 degrees (wherein the angle of incidence of reference light 20*a* is 135 degrees and the angle of incidence of signal light 20*b* is 0 degrees), the overall thickness of hologram layer 13 is 1000 μm, and the refractive-index modulation is n1=1.24×10$^{-5}$.

The full width at half maximum is 0.03 degrees, and hologram layer 13 has angular selectivity that diffracts light of angles of incidence that deviate ±0.015 degrees with respect to the Bragg angle θBragg as light having an angular distribution of ±0.015 degrees.

Here, M/# (M number) is known as a performance index for appraising hologram M that is recorded in the hologram medium. The M/# of the medium per 1 mm of thickness is represented by Formula 1:

Formula 1

$$M/\# = \sum_M \sqrt{\eta_M} \qquad \text{(Formula 1)}$$

As shown in Formula 1, M/# is calculated from the diffraction efficiency ηM in hologram M. When, for example, a photopolymer is used as the hologram medium, M/# in the order of 80-100 can be realized.

Figure 8:
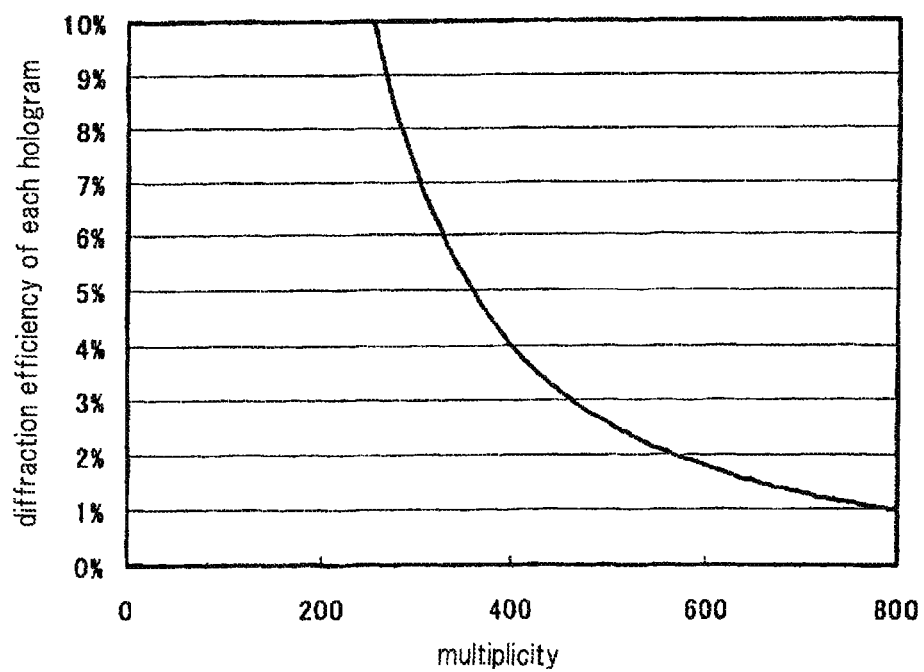
FIG. 8 shows the relation between the multiplicity of the first hologram and second hologram and the diffraction efficiency of each of the first hologram and second hologram in the hologram layer.

FIG. 8 shows the relation between the multiplicity of first holograms 14 and the diffraction efficiency of each first holograms 14 in hologram layer 13. First holograms 14 are calculated as the multiplexed recording in a medium composed of azobenzene in which M/#=80. As shown in FIG. 8, first holograms 14 for which the diffraction efficiency for incident light is 1% can be formed with a multiplicity of 800/2, i.e., 400 first holograms 14 and 400 second holograms 15 can be formed on the same surface, and can be formed each superposed.

As described hereinabove, when reference light 20*a* and 22*a* and signal light 20*b* and 22*b* are irradiated into hologram material in hologram layer 13, each of a plurality of first holograms 14 and a plurality of second holograms 15 can be formed multiplexed by shifting the angle of irradiation of signal light 20b and 22b and the angle of irradiation of reference light 20a and 22a by 0.03 degrees 400 times while maintaining the interference angle θ1 between signal light 20b and 22b and reference light 20a and 22a fixed. At this time, the angular selectivity of all first holograms 14 of hologram layer 13 is the range of 0.03×400=12 degrees. Similarly, the angular selectivity realized by all second holograms 15 of hologram layer 13 is the range of 0.03 ×400=12 degrees.

Essentially, hologram layer 13 diffracts light of an angle range of 12 degrees from light guide body 12 and emits the result as light of an angle range of 12 degrees. If the refractive index of light guide body 12 is here assumed to be 1.5 and the refractive index of air outside optical element 11 is assumed to be 1, the critical angle at the border of optical element 11 and air is 42 degrees. Accordingly, the angular selectivity of hologram layer 13 is smaller than the critical angle at the border of optical element 11 and the air, whereby optical element 11 is capable of raising the directivity of emitted light compared to Patent Document 2.

In addition, when reference light 20a and signal light 20b are irradiated into hologram material, hologram layer 13 may form a plurality of multiplexed first holograms 14 by fixing the angle at which signal light 20b is irradiated and shifting the angle at which reference light 20a is irradiated with respect to signal light 20b 400 times.

By forming a plurality of first holograms 14 in this way, light of different angles of incidence can be diffracted in a range of angles that accords with the angular selectivity of each of first holograms 14. At this time, the interference angle θ1 between signal light 20b and reference light 20a at the time of producing first hologram 14 is within the range of 90 degrees <θ1<180 degrees. In this range, the angular selectivity narrows as the interference angle θ1 decreases. Thus, when the interference angle θ1 of all first holograms 14 is made smaller than 135 degrees, the distribution of diffraction angles is narrower than for a case in which all first holograms 14 are produced at an interference angle of 135 degrees, and the angular selectivity of all first holograms 14 therefore becomes smaller than 0.03 degrees.

Reducing the thickness of hologram layer 13 can broaden the angular selection range of hologram layer 13. However, when the angular selection range is broadened, the diffraction efficiency of hologram layer 13 drops and optical loss increases. As a result, the characteristics of hologram layer 13 are set as appropriate by balancing angular selectivity against optical loss.

In addition, increasing the multiplicity of first holograms 14 can broaden the angular selection range of hologram layer 13. However, when the angular selection range is broadened, the diffraction efficiency of hologram layer 13 drops and optical loss increases. As a result, the characteristics of hologram layer 13 are set as appropriate by balancing angular selectivity against optical loss.

The action by which light that is irradiated into optical element 11 from light-emitting element 10 is emitted from optical element 11 is next described for light source device 1 of the first exemplary embodiment that is configured as described hereinabove.

As shown in FIG. 3, light that is emitted from light-emitting element 10 is irradiated from light-incidence surface 12a of light guide body 12 and propagated in light guide body 12 and hologram layer 13 having a refractive index that is substantially equal to that of light guide body 12 while undergoing multiple reflections. At this time, when all or a portion of the X-polarized light, which is one polarization component of the incident light from light-emitting element 10, is irradiated at an angle of incidence that satisfies the Bragg diffraction condition into first hologram 14 of hologram layer 13, the X-polarized light is diffracted by first holograms 14 by the Bragg angle θBragg with respect to wave vector K. The X-polarized light that was irradiated into first holograms 14, by being diffracted by first holograms 14, is emitted from light guide body 12 as X-polarized light of first phase state P1 at an angle of emission of 0 degrees.

In addition, when all or a portion of Y-polarized light, which is one of the polarization components of incident light from light-emitting element 10, is irradiated into second holograms 15 of hologram layer 13 at an angle of incidence that satisfies the Bragg diffraction condition, the Y-polarized light is diffracted by the Bragg angle θBragg with respect to wave vector K by second holograms 15, and moreover, subjected to polarization-conversion. The Y-polarized light that was irradiated into second holograms 15, by being diffracted by second holograms 15, is emitted from light guide body 12 as X-polarized light of first phase state P1 at an angle of emission of 0 degrees.

Then, because first holograms 14 of hologram layer 13 in the present exemplary embodiment have the above-described angular selection range, the X-polarized light that was irradiated into hologram layer 13 within a predetermined range of angles of incidence is diffracted by the Bragg angle θBragg from the wave vector K of each of first holograms 14 by multiplexed first holograms 14. Accordingly, X-polarized light that is irradiated into first holograms 14 of hologram layer 13 within a predetermined range of angles of incidence is emitted from hologram layer 13 as X-polarized light of first phase state P1 within a predetermined range of angles of emission.

Similarly, second holograms 15 of hologram layer 13 in the present exemplary embodiment also have an angular selection range that is equivalent to that of first holograms 14, and Y-polarized light that is irradiated within a predetermined range of angles of incidence into hologram layer 13 is diffracted by multiplexed second holograms 15 by the Bragg angle θ Bragg from wave vector K of each of second holograms 15, and moreover, is converted to X-polarized light. Accordingly, Y-polarized light that is irradiated within a predetermined range of angles of incidence to second holograms 15 of hologram layer 13 is emitted in a predetermined range of angles of emission from hologram layer 13 as X-polarized light of second phase state P2.

In addition, X-polarized light that is irradiated into hologram layer 13 at angles outside the predetermined range of angles of incidence is transmitted through hologram layer 13 without being diffracted by first holograms 14, is reflected at the interface between hologram layer 13 and the outside (air), and is then again transmitted through hologram layer 13 to return into light guide body 12. Similarly, Y-polarized light that is irradiated into hologram layer 13 at angles outside the predetermined range of angles of incidence is transmitted through hologram layer 13 without being diffracted at second holograms 15 and without undergoing polarization-conversion, is reflected at the interface between hologram layer 13 and the outside (air), and is again transmitted through hologram layer 13 to return into light guide body 12.

As described hereinabove, X-polarized light that is emitted from each of first and second holograms 14 and 15 of hologram layer 13 is transmitted though light guide body 12 and emitted from optical element 11 as emitted light having a predetermined angle of emission. In other words, emitted light in which directivity has been raised by the angular selectivity inherent to first and second holograms 14 and 15 of hologram layer 13 is emitted from optical element 11.

The light that is diffracted from hologram layer 13 in the above-described first exemplary embodiment is not limited to being emitted from the first surface of light guide body 12 that is the surface opposite the surface in which hologram layer 13 is provided but may be emitted from another surface of light guide body 12.

In addition, hologram layer 13 in the first exemplary embodiment is formed with a plurality of first and second holograms 14 and 15 multiplexed, i.e., superposed, but according to necessity, hologram layer 13 may be formed with a plurality of first and second holograms 14 and 15 in multiple layers, i.e., in laminations.

In addition, first holograms 14 and second holograms 15 in the first exemplary embodiment may each correspond to incident light of different wavelengths by a known method such as introducing reactive initiators having different wavelength sensitivities.

In addition, first holograms 14 and second holograms 15 in the first exemplary embodiment may each correspond to light of different directions of incidence by a method such as changing the direction of incidence of reference light at the time of production. To state in greater detail, although reference light was irradiated from the left side of the figure at the time of production of first holograms 14 and second holograms 15 in the examples shown in FIGS. 4A and 4B, first holograms 14 and second holograms 15 may be produced by irradiating the reference light from each of the right side of the figure, the rear side of the figure, and front side of the figure and may thus diffract light that is irradiated from each of the directions toward the upper side of the figure.

As described hereinabove, optical element 11 of light source device 1 of the first exemplary embodiment is able to raise directivity by taking advantage of the angular selectivity inherent to first and second holograms 14 and 15 of hologram layer 13 to narrow the solid angle of emitted light from optical element 11. In addition, in optical element 11 of the first exemplary embodiment, the rate of utilization of light having a broad-band angular distribution from light-emitting element 10 is raised by using hologram layer 13 in which the diffraction efficiency of first and second holograms 14 and 15 is lowered and first and second holograms 14 and 15 that have a narrow-band incident-angle (emission-angle) distribution are multiplexed. Accordingly, optical element 11 is able to convert light irradiated into optical element 11 from light-emitting element 10 to linearly polarized light in which the polarization direction is a specific direction, and moreover, generate emitted light of high directivity with high efficiency. In addition, according to the first exemplary embodiment, the number of parts that make up optical element 11 can be reduced.

The light source device of another exemplary embodiment is next described. The light source device of the other exemplary embodiment differs from the light source device of the first exemplary embodiment only with respect to a portion of the configuration of the optical element. In the optical element in this other exemplary embodiment, constituent parts that are identical to the first exemplary embodiment are given the same reference numbers and redundant description is omitted.

Second Exemplary Embodiment

Figure 9:
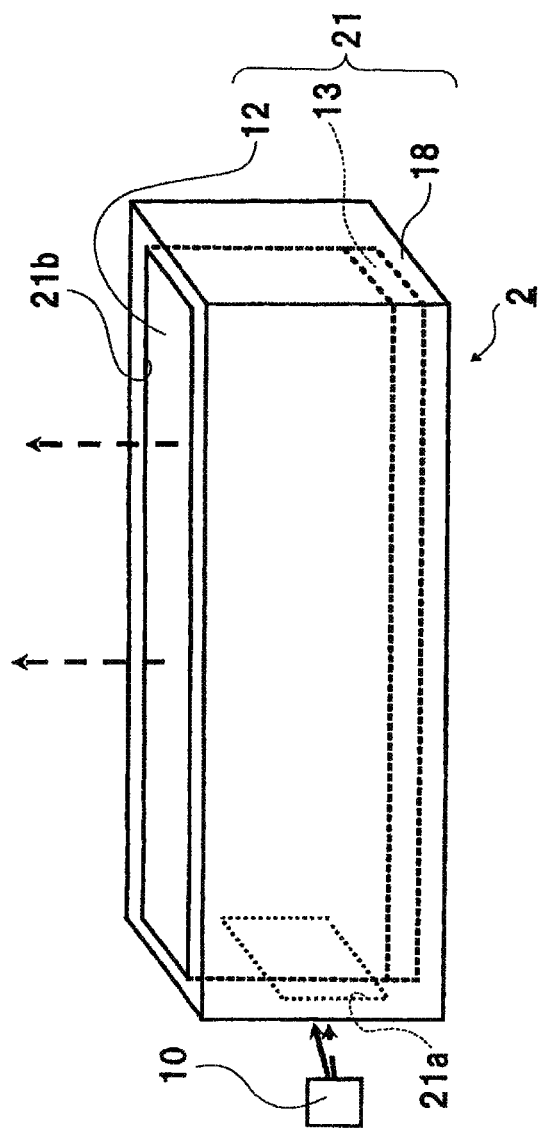
FIG. 9 is a perspective view giving a schematic representation of the light source device of the second exemplary embodiment.
Figure 10:
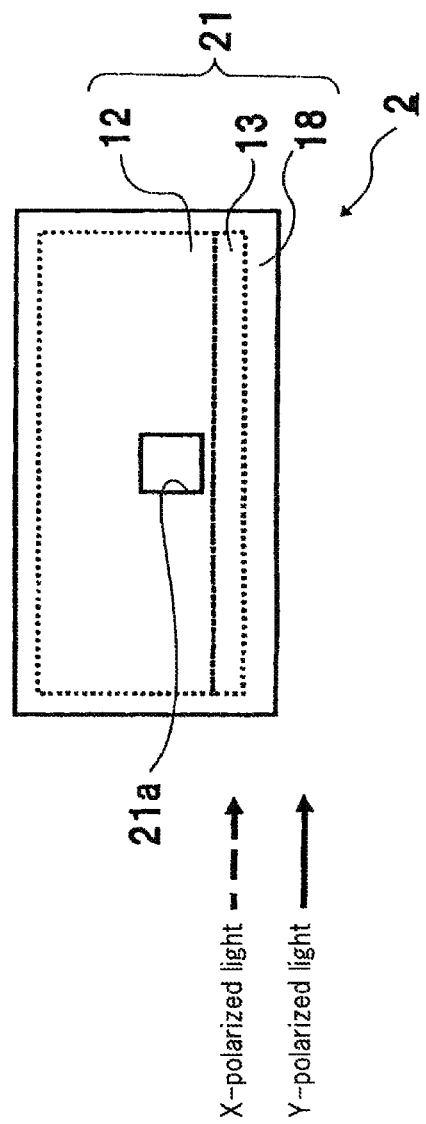
FIG. 10 is a side view giving a schematic view of the light source device of the second exemplary embodiment from the side of light-emitting element.

FIG. 9 is a perspective view of the light source device of the second exemplary embodiment. FIG. 10 shows a side view of the light source device of the second exemplary embodiment as seen from the side of the light-emitting element.

As shown in FIGS. 9 and 10, light source device 2 of the second exemplary embodiment differs from the first exemplary embodiment in that reflective layer 18 that covers light guide body 12 of optical element 21 is provided.

Reflective layer 18 is formed covering all of the surfaces other than an opening as light-incidence portion 21a into which light from light-emitting element 10 is irradiated and other than light-emission portion 21b of optical element 11.

According to light source device 2 of the second exemplary embodiment, the provision of reflective layer 18 surrounding optical element 21 with the exception of light-incidence portion 21a and light-emission portion 21b enables a further improvement of the utilization rate of light that is incident into light guide body 12 from light-emitting element 10.

In addition, in the second exemplary embodiment, reflective layer 18 may be provided to cover only a portion of the surfaces of optical element 21 other than light-incidence portion 21a and light-emission portion 21b and the lower surface of hologram layer 13.

As reflective layer 18, a metal film composed of a metal material such as silver or aluminum or a dielectric multilayer film may be used. In addition, although not shown in the figures, reflective layer 18 may be provided with an uneven construction having a light-scattering effect or with scatterers such as granules.

In the second exemplary embodiment, light-emission portion 21b is not limited to the surface that is opposite hologram layer 13 and may be on another surface. In other words, light that is diffracted from hologram layer 13 is not limited to being emitted from the first surface of light guide body 12 that is the surface opposite the surface on which hologram layer 13 is provided and may be emitted from another surface of light guide body 12 on which reflective layer 18 is not provided.

Third Exemplary Embodiment

Figure 11:
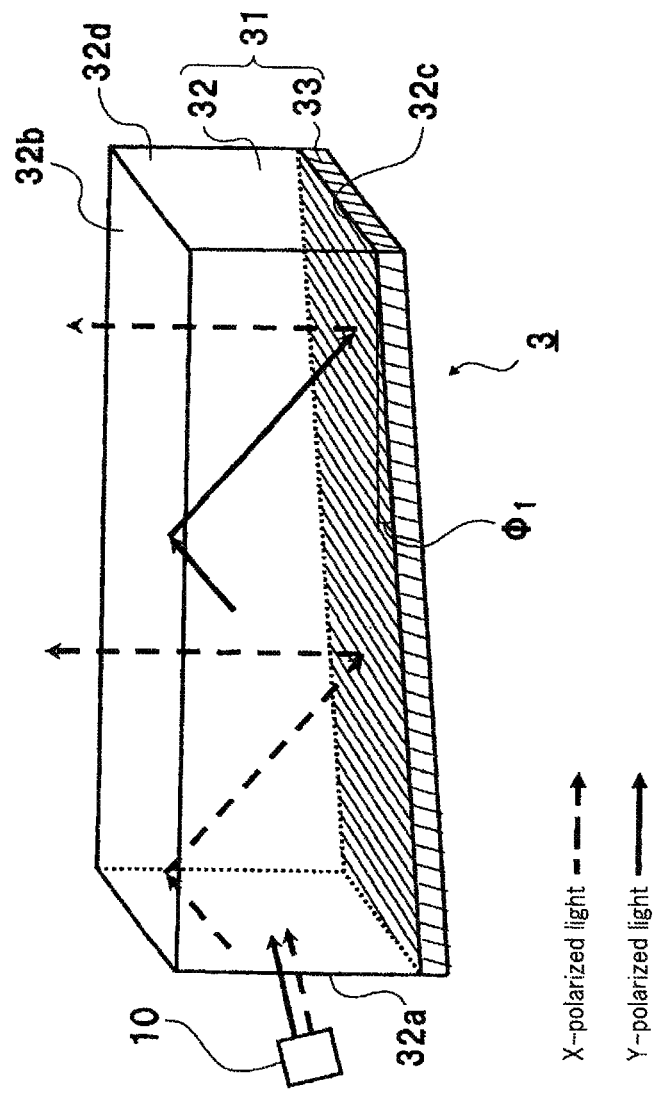
FIG. 11 is a perspective view giving a schematic view of the light source device of the third exemplary embodiment.
Figure 12:
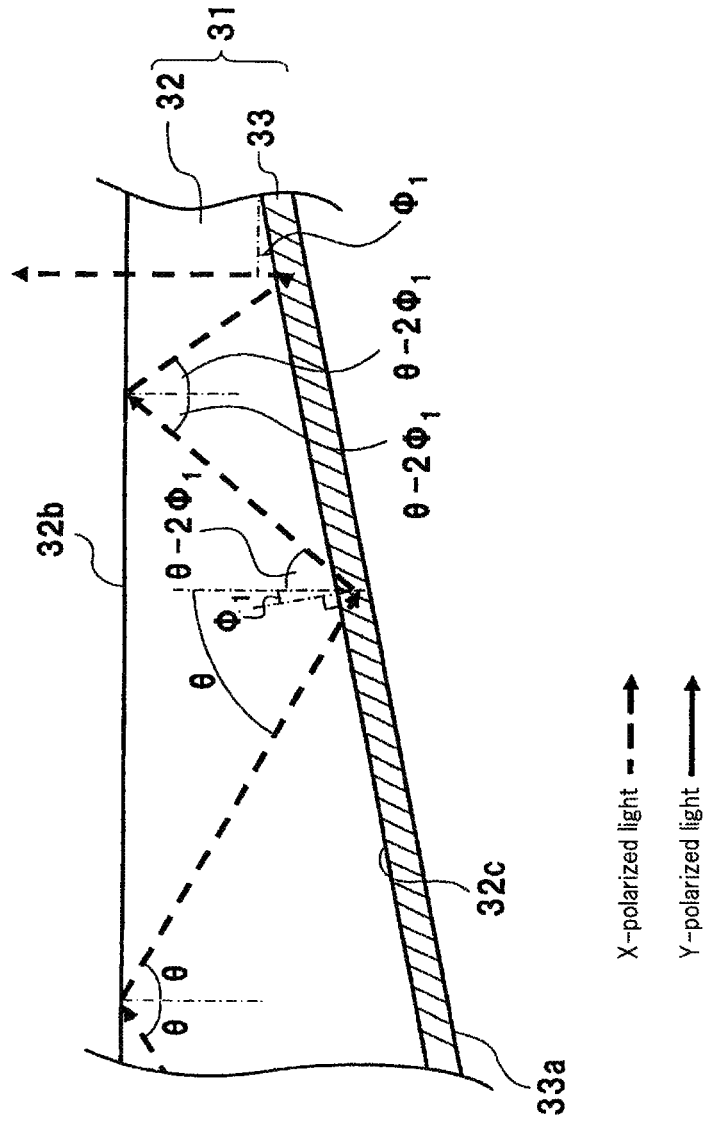
FIG. 12 is a schematic view for describing the behavior of light in the light guide body of the light source device of the third exemplary embodiment.

FIG. 11 shows a perspective view of the light source device of the third exemplary embodiment. FIG. 12 is a schematic view for describing the behavior of light in the light guide body of the light source device of the third exemplary embodiment. As shown in FIG. 11, in light source device 3 of the third exemplary embodiment, the shape of light guide body 32 of optical element 31 differs from the first exemplary embodiment.

Optical element 31 provided in light source device 3 of the third exemplary embodiment is equipped with light guide body 32 in which light-incidence portion 32a is formed into which light from light-emitting element 10 is irradiated. As shown in FIGS. 11 and 12, this light guide body 32 is formed in a trapezoid shape and has first surface 32b from which light from hologram layer 33 is emitted, second surface 32c that is opposite this first surface 32b, and third surface 32d that is opposite light-incidence surface 32a. Second surface 32c of light guide body 32 is inclined such that the thickness of light guide body 32 gradually decreases from the side of light-incidence surface 32a and toward the side of third surface 32d, this surface being inclined at an angle of inclination $\phi 1$ with respect to a plane parallel to first surface 32b.

The behavior of X-polarized light that is reflected by first surface 32b of light guide body 32 for a case in which the angle of incidence of light that is irradiated into hologram layer 33 does not satisfy the Bragg diffraction condition in light guide body 32 of optical element 31 that is configured as described above is next described with reference to FIG. 12.

As shown in FIG. 12, X-polarized light that is irradiated into light guide body 32 from light-emitting element 10 and irradiated at angle of incidence $\theta$ to first surface 32b of light guide body 32 is reflected at a reflection angle $\theta$ at first surface 32b. The X-polarized light that was reflected at first surface 32b is then irradiated into hologram layer 33 that adjoins second surface 32c at an angle of incidence θ-φ1 with respect to the normal of first surface 32b. X-polarized light that is irradiated into hologram layer 33 at angle of incidence θ-φ1 that does not satisfy the Bragg diffraction condition passes through hologram layer 33 and is reflected at interface 33a of hologram layer 33 and the outside (air).

Because second surface 32c is inclined at an inclination angle φ1, X-polarized light that is irradiated into hologram layer 33 is hereupon reflected at an angle of (θ-2φ1) with respect to the normal line of first surface 32b at interface 33a of hologram layer 33 and the outside and emitted into light guide body 32 from hologram layer 33.

As a result, X-polarized light that is emitted from hologram layer 33 is incident to first surface 32b at an angle of incidence (θ-2φ1) that is smaller than the above-described angle of incidence θ. Accordingly, X-polarized light that is irradiated into first surface 32b at angle of incidence (θ-2φ1) is reflected at reflection angle (θ-2φ1) at first surface 32b and again irradiated into hologram layer 33 at an angle of incidence (θ-3φ1).

While undergoing this multiplicity of reflections in light guide body 32, the X-polarized light is irradiated into first holograms 14 and second holograms 15 of hologram layer 33 at an angle that satisfies the Bragg diffraction condition and then emitted as X-polarized light from light guide body 32 at an angle of emission of 0 degrees, as described hereinabove.

The explanation above concerns a case in which X-polarized light is irradiated into first holograms 14 of hologram layer 33, but the case is similar for Y-polarized light that is irradiated into second holograms 15 of hologram layer 33, and redundant explanation is therefore here omitted.

According to light source device 3 of the third exemplary embodiment, the provision of light guide body 32 having second surface 32c that is inclined with respect to a plane that is parallel to first surface 32b brings about a multiplicity of reflections of light from light-emitting element 10 within light guide body 32 and thus allows the angle of incidence of irradiation into hologram layer 33 to be made smaller according to the angle of inclination φ1 of second surface 32c of light guide body 32. Accordingly, by converting light of angles of incidence that are greater than the angle selection range possessed by first and second holograms 14 and 15 of hologram layer 33 to light of angles of incidence within the angle selection range belonging to first and second holograms 14 and 15 by means of optical element 31 of light source device 3, the utilization rate of hologram layer 33 can be improved and the utilization rate of light from light-emitting element 10 can be improved.

In the third exemplary embodiment, second surface 32c of light guide body 32 is made an inclined surface such that the thickness of light guide body 32 decreases from the side of light-incidence surface 32a and toward the side of third surface 32d, but second surface 32c may also be made an inclined surface such that the thickness of light guide body 32 gradually increases from the side of light-incidence surface 32a and toward the side of third surface 32d. Still further, second surface 32c of light guide body 32 is not limited to a configuration that is inclined in a direction parallel to the optical axis of light-emitting element 10, but may also be inclined in a direction orthogonal to the optical axis of light-emitting element 10.

Further, in the third exemplary embodiment, as in the second exemplary embodiment, reflective layer 18 may be provided to cover all or a portion of the surfaces of optical element 31 other than a light-incidence portion and a light-emission portion, and the utilization rate of light from light-emitting element 10 can be further increased.

In the third exemplary embodiment, as in the first exemplary embodiment or second exemplary embodiment, light-emission portion 21b is not limited to the surface that is opposite hologram layer 13, but may be another surface. In other words, light that is diffracted from hologram layer 13 is not limited to being emitted from first surface 12b, which is the surface of light guide body 12 that is opposite the surface in which hologram layer 13 is provided, but may be emitted from another surface of light guide body 12. Adopting such a configuration prevents light that has undergone multiple reflections in light guide body 12 from being subjected to angular conversion by second surface 12c, no longer satisfying the total reflection condition of exterior layer and first surface 12b of light guide body 12, and being leaked to the outside.

In addition, in the above-described first to third exemplary embodiments, explanation regarded a configuration in which hologram layers 13 and 33 diffract X-polarized light that is irradiated into first holograms 14 and converts Y-polarized light that is irradiated into second holograms 15 to X-polarized light, but controry to this configuration, the hologram layer may of course diffract Y-polarized light that is irradiated into first holograms and convert X-polarized light that is irradiated into second holograms to Y-polarized light. In the case of this configuration as well, first and second holograms are formed such that the phase state of Y-polarized light that has been diffracted by first holograms and the phase state of Y-polarized light that has been diffracted and converted by second holograms differ from each other.

In addition, in the above-described first to third exemplary embodiments, the position at which a hologram layer is provided is not limited to the second surface of the light guide body, and the hologram layer may be provided between the first surface and second surface (inside the light guide body) or on the first surface.

The light source device of the present exemplary embodiment is appropriate for use as the light source device of an image display device, and may be used as the light source device equipped in a projection-type display device or in an electronic apparatus such as a portable telephone or a PDA (Personal Data Assistant) as the direct backlit light source device (so-called backlight) of a liquid crystal display panel (LCD).

Finally, an example of the configuration of an LED projector is described with reference to the drawings as a projection-type display device in which the light source device of the above-described first to third exemplary embodiments is applied.

Figure 13:
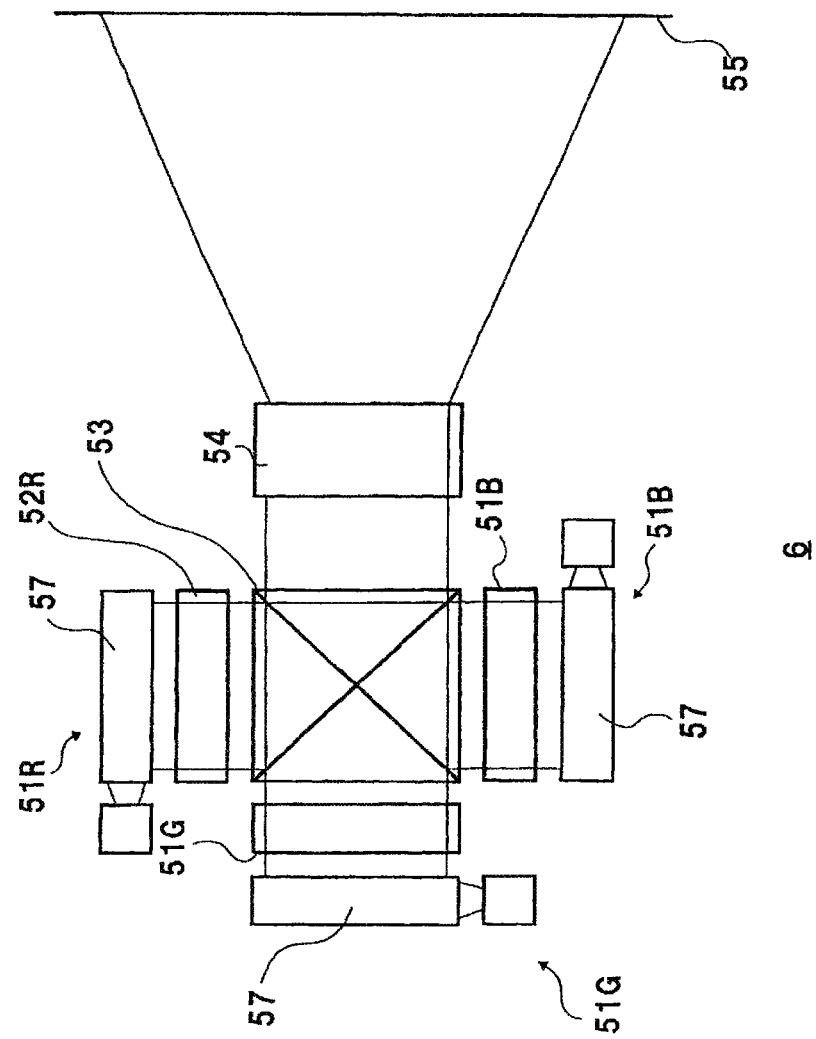
FIG. 13 is a plan view giving a schematic view of the LED projector of an exemplary embodiment.

FIG. 13 shows a schematic view of an LED projector of an exemplary embodiment.

As shown in FIG. 13, LED projector 6 of the exemplary embodiment is equipped with: red (R) light source device 51R, green (G) light source device 51G, and blue (B) light source device 51B; liquid crystal display panels 52R, 52G, and 52B as the display elements into which the emitted light from these light source devices 51R, 51G, and 51B is irradiated; cross-dichroic prism 53 that synthesizes the R, G, and B light that is irradiated and to which picture information has been provided by these liquid crystal display panels 52R, 52G, and 52B; and projection optics 54 that includes a projection lens (not shown) that projects the emitted light from this cross-dichroic prism 53 onto a projection surface 55 such as a screen. In this LED projector 6, a method of simultaneous additive color mixing is adopted and a configuration similar to a three-panel liquid crystal projector is adopted.

Figure 14:
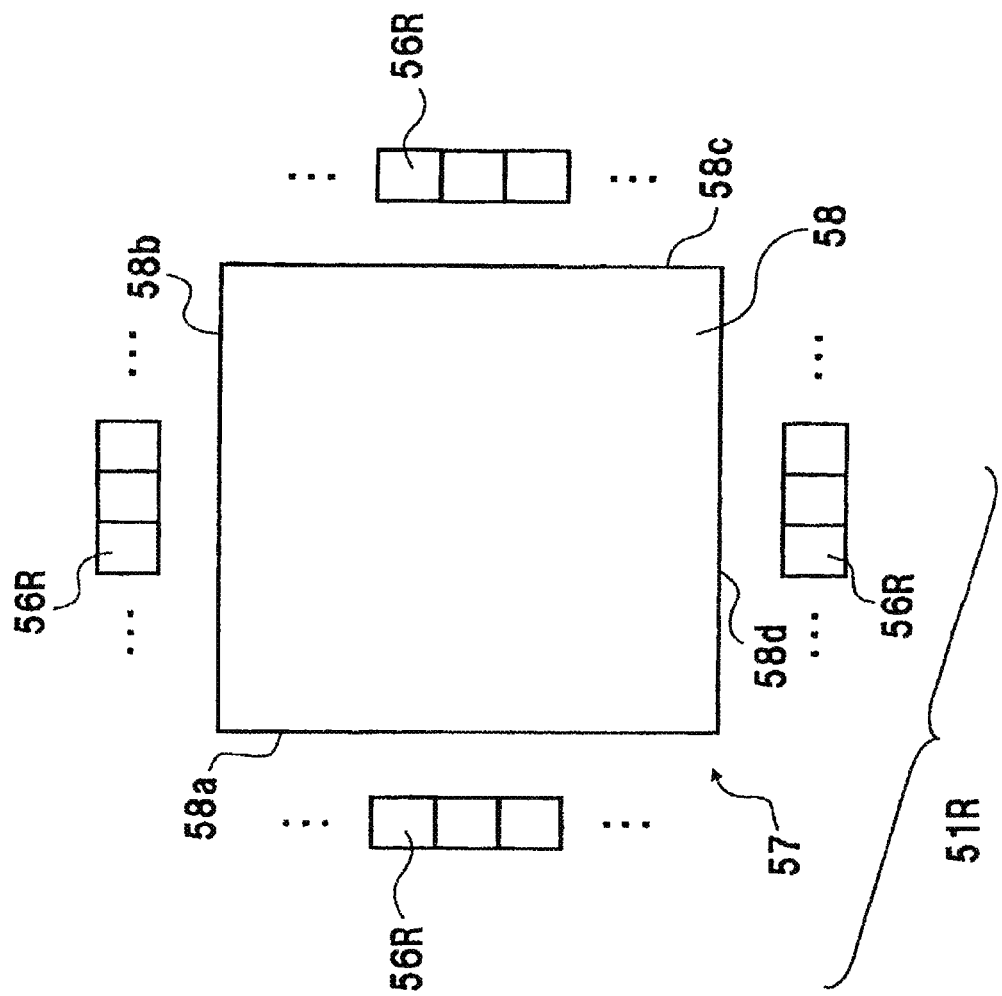
FIG. 14 is a plan view giving a schematic view of the light source device that is equipped in the LED projector of an exemplary embodiment.

FIG. 14 is a plan view showing R light source device 51R that is equipped in LED projector 6 of the exemplary embodiment. Although the configuration of R light source device 51R is described as an example, G light source device 51G and B light source device 51B are also configured similarly to R light source device 51R.

As shown in FIG. 14, R light source device 51R is provided with a plurality of R LEDs 56R as light-emitting elements and optical element 57 into which the light from these R LEDs 56R is irradiated. Light guide body 58 included in optical element 57 is formed in a plate form in which the principal surface is formed as a square, and the plurality of R LEDs 56R are arranged at opposite positions of the four side surfaces 58a-58d of the periphery.

This optical element 57 is of a similar configuration to any of optical elements 11, 21, and 31 in the above-described exemplary embodiments.

Light from the plurality of R LEDs 56R is irradiated into light guide body 58 of optical element 57 from each of side surfaces 58a-58d, whereby light of differing directions of incidence is irradiated to light guide body 58. As a result, the hologram layer (not shown) that belongs to optical element 57 in this exemplary embodiment has four types of first holograms and four types of second holograms corresponding to light of different directions of incidence to light guide body 58. These first holograms and second holograms are formed by multiplexing but of course may also be formed in multiple layers.

According to LED projector 6 of the present exemplary embodiment, the provision of light source devices 51R, 51G and 51B in which the light source device of the above-described exemplary embodiments is applied enables an improvement in the luminance of the projected image.

Figure 15:
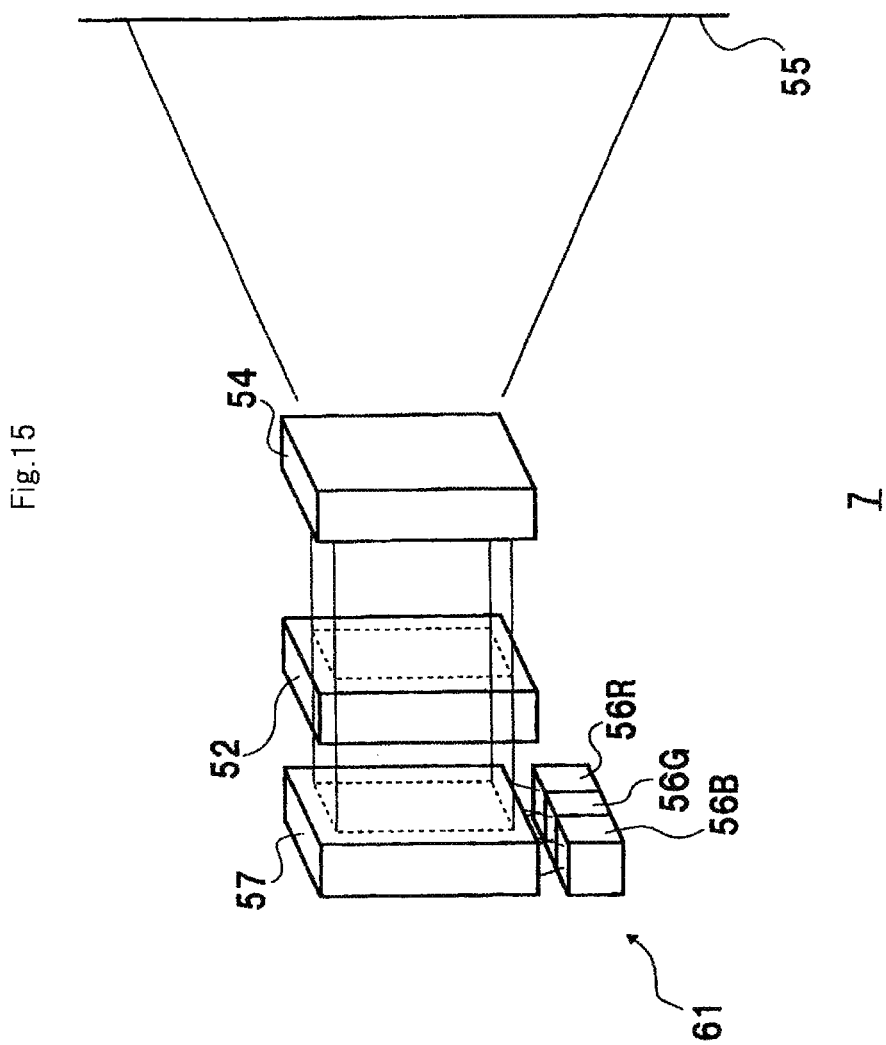
FIG. 15 is a perspective view giving a schematic representation of the LED projector of another exemplary embodiment.

FIG. 15 is a schematic view of an LED projector of another exemplary embodiment. As shown in FIG. 15, LED projector 7 of this exemplary embodiment is provided with: light source device 61, liquid crystal display panel 52 into which the emitted light from this light source device 61 is irradiated, and projection optics 54 that include a projection lens (not shown) that projects the emitted light from this liquid crystal display panel 52 onto projection surface 55 such as a screen.

In light source device 61 that is provided in LED projector 7, R LED 56R, G light-emitting element 56G, and B light-emitting element 56B are each arranged on one side surface of light guide body 58 of optical element 57. In this LED projector 7, a time-division method is adopted, and a control circuit unit (not shown) implements switching such that only one LED from among R LED 56R, G LED 56G and B LED 56B emits light.

Alternatively, light from each of R LED 56R, G LED 56G and B LED 56B in which the emitted optical wavelengths differ is irradiated into light guide body 58 of optical element 57. As a result, the hologram layer belonging to optical element 57 in this exemplary embodiment has three types of first holograms and three types of second holograms corresponding to the light of each of the different emitted optical wavelengths from R LED 56R, G LED 56G and B LED 56B. Although these first and second holograms are formed by multiplexing, they may, of course, also be formed in multiple layers. Alternatively, the first and second holograms may be formed by multiplexing, and further, in multiple layers. For example, the hologram layer may adopt a multilayer construction having a first layer in which R first and second holograms are multiplexed, a second layer in which G first and second holograms are multiplexed, and a third layer in which B first and second holograms are multiplexed.

Alternatively, light from a plurality of R LEDs 56R, G LEDs 56G, B LEDs 56B may be irradiated into light guide body 58 of optical element 57 from four side surfaces 58a-58d on the periphery of light guide body 58 as shown in FIG. 14. In the case of this configuration, the hologram layer that belongs to optical element 57 has 12 types of first holograms and 12 types of second holograms corresponding to light for which the direction of incidence (four directions) to light guide body 58 and the wavelengths (three wavelengths) differ. These first and second holograms may be formed by multiplexing, or may be formed in multiple layers. In addition, a hologram layer that includes a plurality of first and second holograms may adopt a four-layer construction in which, for example, layers in which first and second holograms corresponding to each of the wavelengths of R, G, and B are multiplexed are stacked corresponding to each direction of incidence.

According to LED projector 7 of the present exemplary embodiment, the provision of light source device 61 in which the light source device of the above-described exemplary embodiments is applied enables an improvement of the luminance of a projected image.

Although the present invention was described with reference to exemplary embodiments, the present invention is not limited to the above-described exemplary embodiments. The configuration and details of the present invention are open to various modifications within the scope of the present invention that will be clear to one of ordinary skill in the art.

This application claims the benefits of priority based on Japanese Patent Application No. 2009-262809 for which application was submitted on Nov. 18, 2009 and incorporates by citation all of the disclosures of that application.

The invention claimed is:

1. An optical element comprising a hologram layer into which light from a light source is irradiated, said hologram layer comprising:
   a first hologram that diffracts in a predetermined direction, from among light irradiated from said light source, first linearly polarized light in which the polarization component is in a specific direction and emits the result as said first linearly polarized light of a first phase state; and
   a second hologram that both diffracts in the same direction as said first linearly polarized light, and moreover, at an equal radiation angle, from among light irradiated from said light source, second linearly polarized light in which the polarization component is in a direction orthogonal to that of said first linearly polarized light and converts it to said first linearly polarized light, and emits the result as said first linearly polarized light of a second phase state that differs from said first phase state.

2. The optical element as set forth in claim 1, further comprising a light guide body into which light from said light source is irradiated, wherein:
   said light guide body includes a light-incidence surface into which light from said light source is irradiated and a first surface that emits light from the light guide body; and
   said hologram layer is provided inside said light guide body or on at least one surface of said light guide body.

3. The optical element as set forth in claim 2, further comprising a reflective layer that reflects light that has passed through said hologram layer and that is provided on at least a portion of surfaces of said light guide body other than said light-incidence surface and said first surface.

4. The optical element as set forth in claim 3, wherein said reflective layer is constituted to include scatterers.

5. The optical element as set forth in claim 2, further comprising a light guide body into which light from said light source is emitted, wherein:
said light guide body includes a first surface from which light from the light guide body is irradiated; and
the surface opposite said first surface of said light guide body is inclined with respect to said first surface.

6. The optical element as set forth in claim 1, further comprising a light guide body into which light from said light source is irradiated, wherein:
said light guide body includes a light-incidence surface into which light from said light source is irradiated, a first surface that emits light from the light guide body, and a second surface that is opposite said first surface;
said hologram layer is provided on said second surface of said light guide body; and
said first hologram and said second hologram each emit said first linearly polarized light from said first surface.

7. The optical element as set forth in claim 6, further comprising a reflective layer that reflects light that passes through said hologram layer and that is provided on at least a portion of the surfaces of said light guide body other than said light-incidence surface, said first surface, and said second surface, or at least the surface that is opposite said second surface of said hologram layer.

8. The optical element as set forth in claim 1, wherein in said hologram layer, said first hologram and said second hologram are formed in multiple layers.

9. The optical element as set forth in claim 1, wherein in said hologram layer, said first hologram and said second hologram are formed multiplexed.

10. The optical element as set forth in claim 1, wherein said hologram layer includes a plurality of said first holograms that diffract each of a plurality of incident light of said first linearly polarized light having different angles of incidence in a predetermined direction.

11. The optical element as set forth in claim 1, wherein said hologram layer includes a plurality of said second holograms that both diffract in a predetermined direction each angle of incident light of a plurality of said second linearly polarized light having different angles of incidence and convert them to said first linearly polarized light.

12. The optical element as set forth in claim 1, wherein said hologram layer includes a plurality of said first holograms that correspond to each incident light of a plurality of said first linearly polarized light having different wavelengths.

13. The optical element as set forth in claim 1, wherein said hologram layer includes a plurality of said second holograms that correspond to each incident light of a plurality of said second linearly polarized light having different wavelengths.

14. The optical element as set forth in claim 1, wherein said hologram layer includes a plurality of said first holograms that correspond to each direction of a plurality of light rays having different directions of incidence to said light guide body.

15. The optical element as set forth in claim 1, wherein said hologram layer includes a plurality of said second holograms that correspond to each direction of a plurality of light rays having different directions of incidence to said light guide body.

16. A light source device comprising:
the optical element as set forth in claim 1;
a light guide body into which light from said light source is irradiated; and
at least one light source arranged on the periphery of said light guide body.

17. The light source device as set forth in claim 16, wherein said light source is a solid-state light source.

18. A projection-type display device comprising:
the light source device as set forth in claim 16;
display element that provides picture information to emitted light of said light source device; and
projection optics that project a projection image realized by emitted light of said display element.

* * * * *